United States Patent
Nemazi et al.

(10) Patent No.: US 9,701,075 B2
(45) Date of Patent: Jul. 11, 2017

(54) MOLD INSERT FOR IMPROVED HEAT TRANSFER

(75) Inventors: John E. Nemazi, Bloomfield Hills, MI (US); Mark Manuel, Shelby Township, MI (US); Matthew T. Lowney, Davisburg, MI (US)

(73) Assignee: FloodCooling Technologies, LLC, Troy, MI (US)

( * ) Notice: Subject to any disclaimer, the term of this patent is extended or adjusted under 35 U.S.C. 154(b) by 1688 days.

(21) Appl. No.: 14/001,401

(22) PCT Filed: Feb. 26, 2010

(86) PCT No.: PCT/US2010/025597
§ 371 (c)(1),
(2), (4) Date: Aug. 23, 2013

(87) PCT Pub. No.: WO2010/099450
PCT Pub. Date: Sep. 2, 2010

(65) Prior Publication Data
US 2014/0021653 A1 Jan. 23, 2014

Related U.S. Application Data

(60) Provisional application No. 61/155,840, filed on Feb. 26, 2009.

(51) Int. Cl.
*B29D 22/00* (2006.01)
*B21D 37/16* (2006.01)
(Continued)

(52) U.S. Cl.
CPC ........... *B29D 22/003* (2013.01); *B21D 37/16* (2013.01); *B22D 17/2209* (2013.01);
(Continued)

(58) Field of Classification Search
CPC ........ B29C 45/7312; B29C 2049/4828; B29D 22/003
(Continued)

(56) References Cited

U.S. PATENT DOCUMENTS 3,024,002 A 3/1963 Beck
3,381,897 A 5/1968 Wennerstrom
(Continued)

FOREIGN PATENT DOCUMENTS

DE CA 2636832 A1 * 8/2007 ......... B29C 45/7312
JP 58102734 A 6/1983
(Continued)

OTHER PUBLICATIONS

International Search Report and Written Opinion for corresponding Application No. PCT/US2010/025597, mailed Oct. 13, 2010, 9 pages.
(Continued)

*Primary Examiner* — Alison L Hindenlang
*Assistant Examiner* — Lawrence D Hohenbrink, Jr.
(74) *Attorney, Agent, or Firm* — Brooks Kushman P.C.

(57) ABSTRACT

A mold block includes a tool body with a contoured finished surface adapted to receive a tool insert having a forming surface for forming a bottle neck in a molding operation. The tool body defines an internal channel for heat transfer with the forming surface. At least a portion of the channel is offset generally equidistant from the finished surface to provide a path contoured for conformal cooling of the insert. The tool body has a pair of ports intersecting the channel. Several methods for forming a mold block are disclosed and include machining a contoured finished surface adapted to receive a tool insert on a tool body, forming a heat transfer channel within the tool body, and forming a pair of ports into the tool body. At least a portion of the channel is offset generally
(Continued)

equidistant from the finished surface for conformal cooling of the insert.

22 Claims, 5 Drawing Sheets (51) Int. Cl.
  B22D 17/22 (2006.01)
  B23P 13/02 (2006.01)
  B23P 15/24 (2006.01)
  B29C 45/73 (2006.01)
  B29C 49/48 (2006.01)
  B29L 31/00 (2006.01)

(52) U.S. Cl.
  CPC .......... *B22D 17/2218* (2013.01); *B23P 13/02* (2013.01); *B23P 15/24* (2013.01); *B29C 45/7312* (2013.01); *B29C 49/4823* (2013.01); *B29C 2049/4828* (2013.01); *B29C 2049/4861* (2013.01); *B29L 2031/7158* (2013.01); *Y10T 29/49* (2015.01); *Y10T 29/49988* (2015.01)

(58) Field of Classification Search
  USPC .................................. 249/79; 425/526, 552
  See application file for complete search history.

(56) References Cited

U.S. PATENT DOCUMENTS

| | | | |
|---|---|---|---|
| 3,392,045 | A | 7/1968 | Holub |
| 3,558,886 | A | 1/1971 | Carver |
| 3,673,678 | A | 7/1972 | Moreau et al. |
| 4,608,698 | A | 8/1986 | Moller et al. |
| 4,752,352 | A | 6/1988 | Feygin |
| 4,760,849 | A | 8/1988 | Kropf |
| 5,031,483 | A | 7/1991 | Weaver |
| 5,192,623 | A | 3/1993 | Gewelber |
| 5,589,204 | A | 12/1996 | Wohlgemuth |
| 6,581,640 | B1 | 6/2003 | Barron |
| 6,587,742 | B2 | 7/2003 | Manuel et al. |
| RE38,396 | E | 1/2004 | Gellert |
| 6,677,054 | B1 | 1/2004 | Hermann et al. |
| 7,195,223 | B2 | 3/2007 | Manuel et al. |
| 7,234,930 | B2 | 6/2007 | Niewels et al. |
| 7,296,442 | B2 | 11/2007 | Flynn |
| 8,079,509 | B2 | 12/2011 | Lowney et al. |
| 2003/0031814 | A1 | 2/2003 | Hutchinson et al. |
| 2004/0103709 | A1 | 6/2004 | Manuel et al. |
| 2005/0040210 | A1 | 2/2005 | Sandin |
| 2005/0064061 | A1 | 3/2005 | Eichlseder |
| 2005/0263673 | A1* | 12/2005 | Bachan ................. B29C 33/72 249/79 |
| 2005/0276879 | A1* | 12/2005 | Niewels ............. B29C 45/7312 425/547 |
| 2006/0055085 | A1 | 3/2006 | Nakagawa et al. |
| 2006/0249872 | A1 | 11/2006 | Manuel et al. |
| 2007/0264383 | A1* | 11/2007 | Niewels ................. B29C 33/04 425/526 |
| 2007/0267783 | A1* | 11/2007 | Niewels ................. B29C 33/02 264/327 |
| 2008/0003323 | A1 | 1/2008 | Manuel et al. |
| 2008/0011417 | A1 | 1/2008 | Manuel et al. |
| 2008/0017694 | A1 | 1/2008 | Schnell et al. |
| 2012/0058364 | A1 | 3/2012 | Lowney et al. |

FOREIGN PATENT DOCUMENTS

| | | |
|---|---|---|
| JP | 63015707 A | 1/1988 |
| JP | 8216304 A | 8/1996 |
| JP | 2002205131 A | 7/2002 |
| JP | 2004195720 A | 7/2004 |
| JP | 2005095918 A | 4/2005 |
| JP | 2005193274 A | 7/2005 |
| JP | 2005264316 A | 9/2005 |
| WO | 2010099450 A2 | 9/2010 |
| WO | 2010099450 A3 | 9/2010 |

OTHER PUBLICATIONS

Bales et al., "Fabrication and Evaluation of Brazed Titanium-Clad Borsic® / Aluminum Skin-Stringer Panels", NASA Technical Paper 1674, Jul. 1980, 41 pages.

* cited by examiner

MOLD INSERT FOR IMPROVED HEAT TRANSFER

CROSS-REFERENCE TO RELATED APPLICATION

This application is the U.S. national phase of PCT Application No. PCT/US2010/025597 filed on Feb. 26, 2010, which claims the benefit of U.S. Provisional Application No. 61/155,840 filed on Feb. 26, 2009, the disclosures of which are incorporated in their entirety by reference herein.

TECHNICAL FIELD

Various embodiments of the invention relate to methods for forming mold tooling with improved heat transfer characteristics, and tooling formed thereby.

BACKGROUND

Various tools are conventionally utilized for forming articles using various forming processes, such as injection molding, blow molding, reaction injection molding, die casting, stamping and the like. These tools often include a core block, a cavity block and inserts. The blocks each having opposing forming surfaces for collectively forming an article therebetween. The blocks are often formed separately, and one block translates relative to the other for closing, forming the article, opening, removing the article, and repeating these steps. Often, the blocks are each formed from a solid block of material that is capable of withstanding the stresses, pressures, impacts and other fatigue associated with the forming processes.

These tool components are commonly cooled using cooling channels below the mold cavity surface. The cooling efficiency typically determines the quality of the molded component, and how much time it takes to mold the part into a finished solid manufactured part. The cooling efficiency is dependent on the following: thermal properties of the tool material; the geometry of the cooling channels relative to the tool surface; the amount of cooling surface area relative to molded tool or component surface area; thermal properties of molded material; and molding process environment or conditions.

Typical constraints of the molding processes are the thermal properties of molded material, molding process environment or conditions, and, for some applications, thermal properties of the tool or tool component material. With these constraints considered, opportunities to improve the cooling efficiency exist with the geometry of the cooling channels relative to the tool or tool component surface and the amount of cooling surface area relative to molded tool, or component, surface area. Conventional machining and manufacturing methods are limited to how the cooling channels can be designed into the tool, because they are formed using a drill and must consider tool geometry. Therefore, the conformal cooling process presents great opportunity to improve cooling efficiency because of the ability to create large surface area conformal cooling channels, and undulations in cooling channel surface to induce turbulent flow.

Relatively recently, laminated tooling has been introduced in the plastic injection molding industry of the type shown in U.S. Pat. Nos. 5,031,483, 6,587,742, 7,021,523, and 7,376,484.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
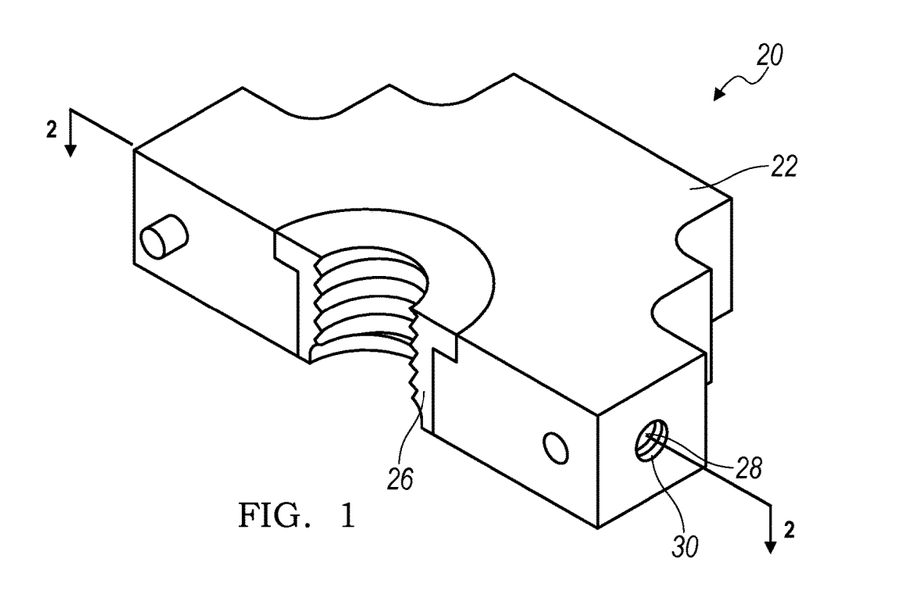
FIG. 1 is a perspective view of a tool illustrating an embodiment of the present invention.
Figure 2:
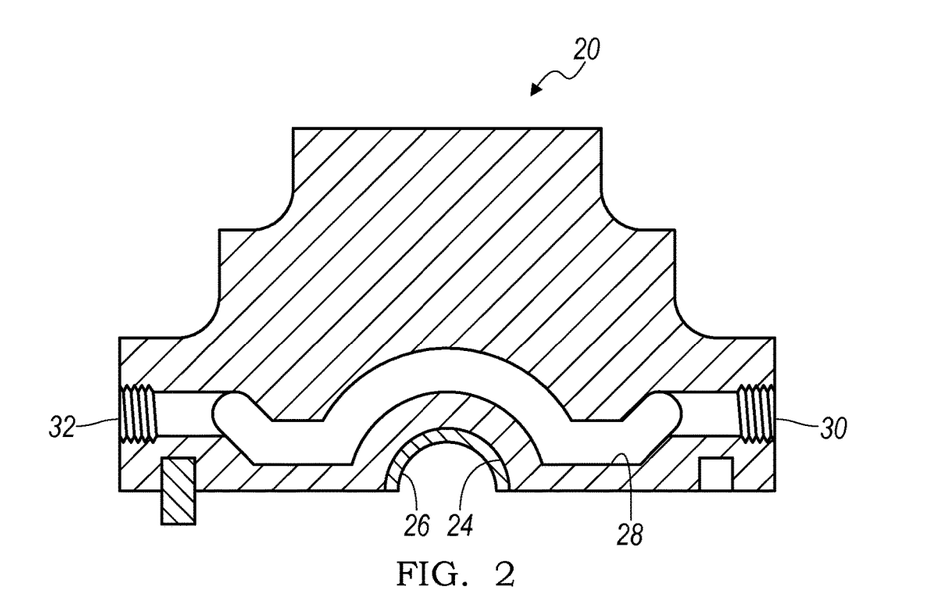
FIG. 2 is a section view of the tool of FIG. 1.

With reference now to FIGS. 1 and 2, a tool is illustrated and referenced generally by numeral 20. The tool 20 is a tool for forming an article and a mold, such as an injection molding, blow molding, reaction injection molding, rotomolding, die casting, stamping, extruding, or the like. Alternatively, the tool 20 may be a mandrel that is shaped similar to the article for forming a molding tool, a die casting tool, a stamping tool, or the like, wherein the mandrel is not employed for forming the article itself. Although one tool 20 is illustrated, the invention contemplates that the tool 20 may be a mold member, which is utilized in combination with one or more mold members, such as an opposed mold half for forming an article collectively therebetween. Although the item 20 is referred to as a tool, the invention contemplates that this item may be a tool, a tool component, or tool insert.

The tool 20 includes a tool body 22, which has a finished surface 24 (FIG. 2) for receiving a tool insert 26 (FIG. 1). The depicted embodiment is utilized for cooling the tool insert 26 during a molding operation. More specifically, the tool insert 26 mates with a corresponding tool insert (not shown) for forming a neck on a bottle during a blow molding operation. The tool 20 is utilized for locating and cooling the tool insert 26. The typical prior art has provided tools for cooling tooling inserts that are formed from a single block that is machined with cooling patterns. Such cooling patterns are drilled by gun drills and consequently are limited to linear fluid paths.

Since bottle shapes are often standardized, tools for cooling an insert such as the tool 20 are often mass produced. In order to mass produce the tool 20 and provide cooling to the insert 26 that is advantageous over the prior art, the tool body 22 may be cast from aluminum. As illustrated in FIG. 2, a cooling channel 28 is illustrated that is not limited to linear paths; rather, the cooling channel 28 is designed specifically to conform to the shape of the insert 26 with ports 30, 32 at opposed ends. Additionally, the cooling channel 28 may be formed with a rough surface finish thereby enhancing turbulence of coolant passing therethrough and increasing the efficiency of the cooling operation.

The tool body 22 can be cast from A357.0-T61 aluminum in a permanent mold and can achieve mechanical properties similar to 6061-T6 alloy aluminum, such as hardness. A permanent mold cast process allows for reuseable metal molds for high production volumes of castings. The permanent mold also permits a higher density than a sand core mold. Of course, a sand core mold may also be employed.

Figure 3:
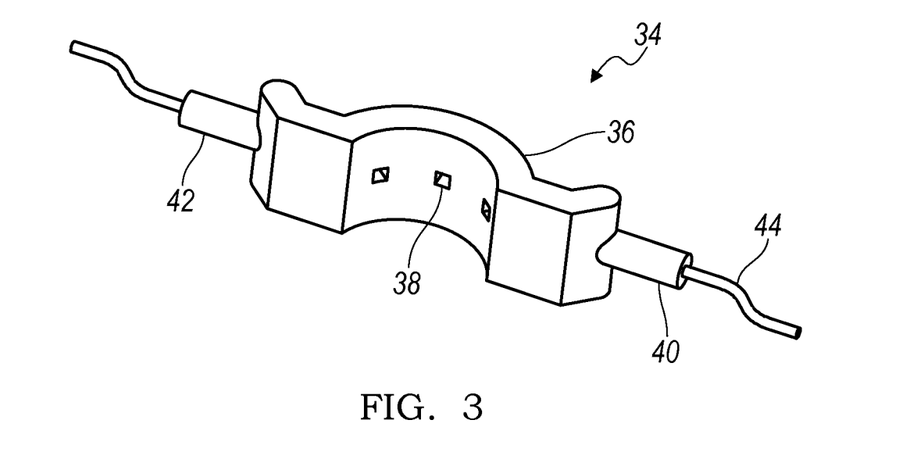
FIG. 3 is a perspective view of a sand core insert for forming the tool of FIG. 1.

Referring now to FIG. 3, a sand core insert 34 is illustrated that may be utilized for casting the cooling channel 28 in the tool body 22. The sand core insert 34 may be employed in either the permanent mold process or in a sand core casting process. The sand core insert 34 includes a conformal cooling portion 36 that is sized to provide conformal cooling to the tool insert 26. The conformal cooling portion 36 may include apertures 38 formed therethrough to consequently provide structural ribs in the center of the cooling channel 28 that enhance the structural integrity of the tool body 22 and increase turbulence of coolant therein for increasing the efficiency of the cooling operation. Alternatively, shallow depressions in the sand core insert 34 can form projections in the formed part 22 to increase turbulence in desired areas of the cooling channel 28. The sand core insert 34 also includes a pair of cylindrical plugs 40, 42, which extend from the conformal cooling portion 36 in order to provide the ports 30, 32 for the cooling channel 28. A wire reinforcement 44 may be utilized for adhering the sand of the sand core insert 34 to the wire reinforcement 44 such that the sand is supported upon the wire reinforcement 44 and the wire reinforcement 44 is employed for locating the sand core insert 34 properly in the mold prior to casting the tool body 22. The wire 44 further aids in breaking up and removing the sand core 34 from the finished casting 22.

The sand core insert 34 is generated by known methods for preparing sand core inserts for casting aluminum. Sand is mixed with a binder and molded upon the wire reinforcement 34. After the binder dries and hardens, the sand core insert 34 is placed within the mold for the tool body 22. Molten aluminum is cast about the sand core insert 34 within a mold cavity and cooled to provide a tool body about the sand core insert 34. Subsequently, the tool body 22 is vibrated to break the sand in the sand core insert 34 and to remove the sand from the tool body 22. Likewise, the wire reinforcement 44 is removed from the tool body 22.

Although a cast aluminum tool body 22 may result in a slight decrease in thermal conductivity in comparison to a solid tool block, a greater rate of cooling is obtained by employing the conformal cooling channel thereby justifying the utilization of a casted tool body 22.

Figure 4:
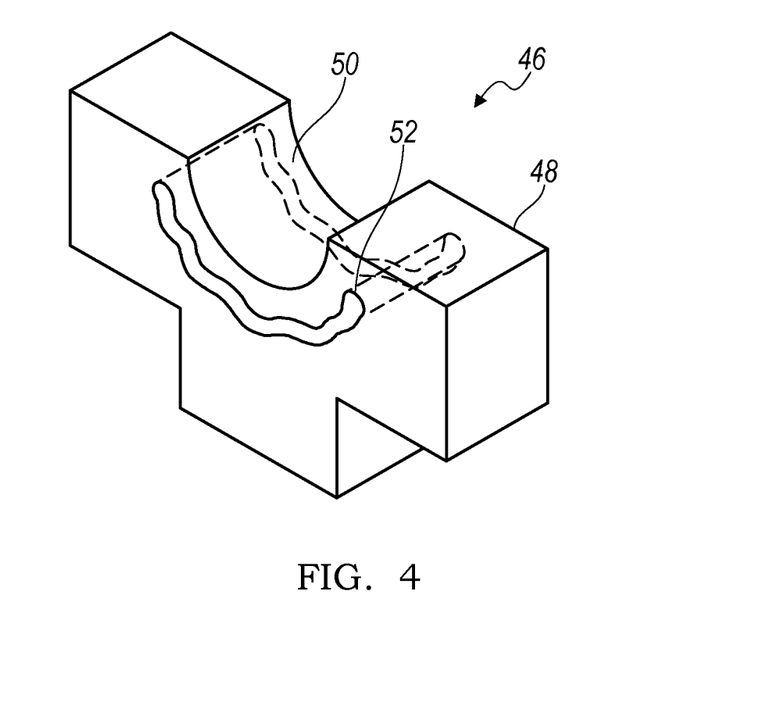
FIG. 4 is a perspective view of a second tool illustrating an alternate embodiment of the present invention.

FIG. 4 illustrates another embodiment for forming a tool 46 with a rapid process for high volume production. The tool 46 includes a tool body 48 with a finished arcuate surface 50 for receiving a tool insert. The tool body 48 is employed for cooling the tool insert. The tool body 48 may preferably be formed from a solid block of 6061-T6 aluminum, but other alloys could be used based on cost, thermal properties, and manufacturability factors. A cooling channel 52 may be cut through the block 48 by milling, wire cutting, water jet cutting, laser cutting, or the like. This process permits a cooling channel 52 that conforms to the finished surface 50. An arcuate channel 52 is shown in FIG. 4, however the ends of the arc could be extended linearly along the face as shown in the embodiments in FIGS. 2 and 8.

Figure 5:
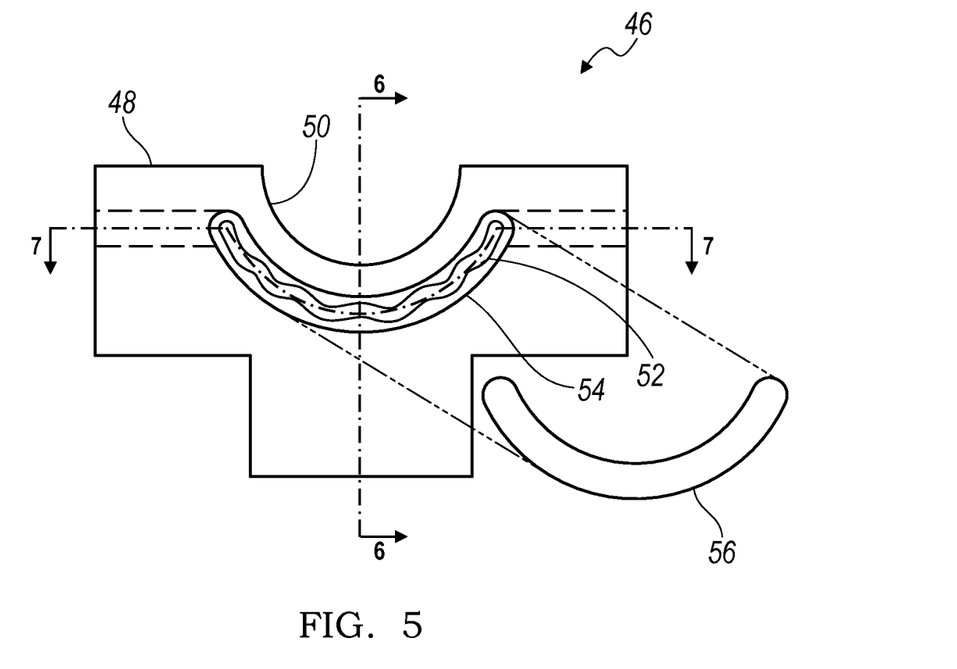
FIG. 5 is a partially exploded top plan view of the tool of FIG. 4.
Figure 6:
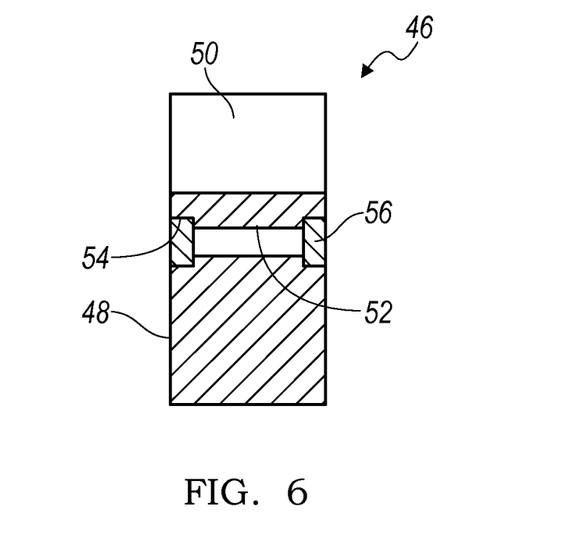
FIG. 6 is a section view taken along section line 6-6 in FIG. 5.
Figure 7:
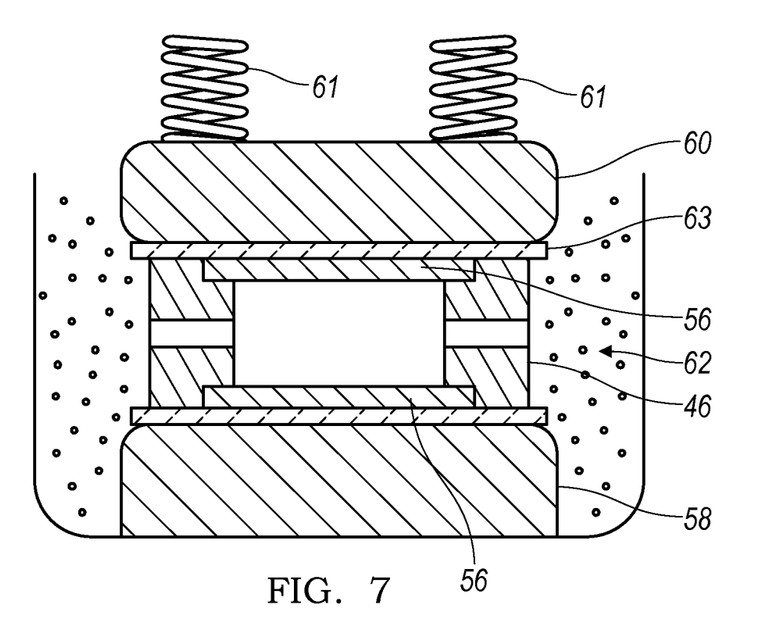
FIG. 7 is a schematic illustrating a brazing process for the tool of FIG. 4.

Referring now to FIG. 5, each side of the tool body 48 is machined with a shallow recess 54 having a blind depth and being oversized relative to the cooling channel 52 forming a ledge about the channel periphery. Also illustrated in FIG. 5 is an aluminum cover plate 56 that is sized to be received within the recess 54. Referring now to FIG. 6, the cover plate 56 is inserted into each of the recesses 54 to cap off the cooling channel 52. A brazing material may be provided between each of the cover plates 56 and the corresponding recess 54. Referring now to FIG. 7, the tool body 48 may be placed between heated platens 58, 60 in an inert atmosphere 62 to braze each of the cover plates 56 within the associated recess 54 thereby capping off the cooling channel 52. A pair of inlet/outlet ports may be drilled into the block 48 in fluid communication with the cooling channel 52 before or after the brazing process.

Figure 8:
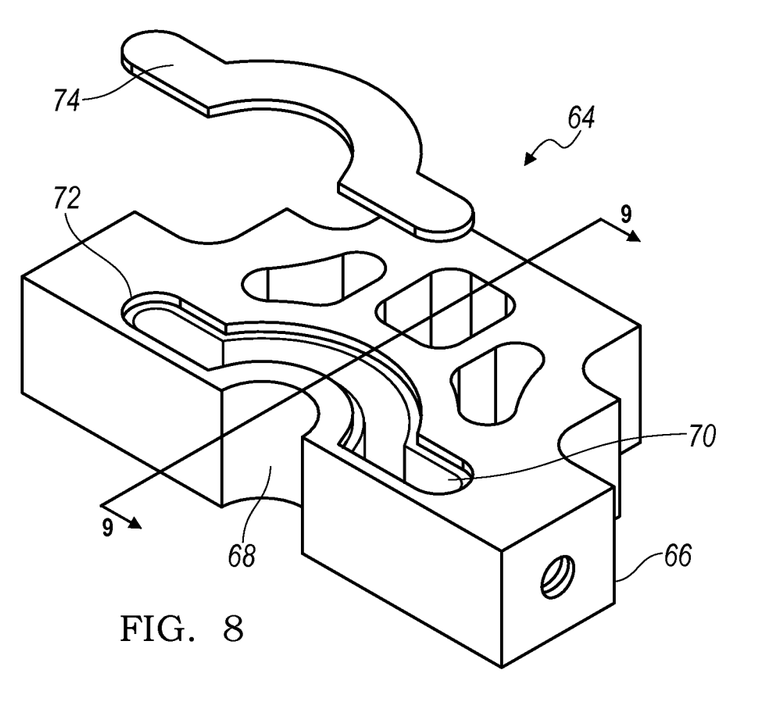
FIG. 8 is an exploded perspective view of a third tool illustrating another alternative embodiment of the invention.
Figure 9:
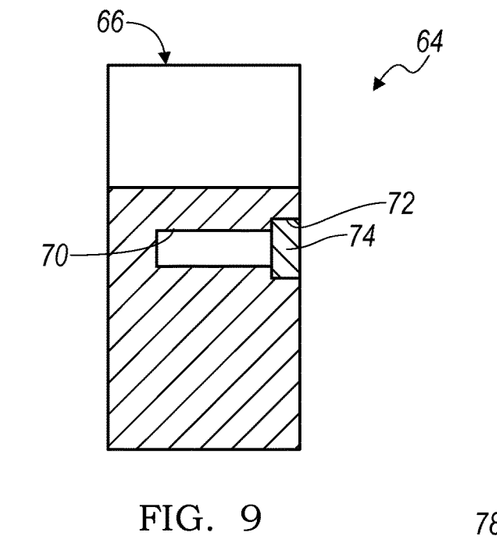
FIG. 9 is a section view taken along section line 9-9 in FIG. 8.

Referring now to FIGS. 8 and 9, another tool 64 is illustrated with a tool body 66 machined from 6061-T6 aluminum. The tool body 66 has a finished surface 68 for receiving a tool insert that is cooled by the tool 64. Likewise, a cooling channel 70 is cut into the tool body 66 by any conventional cutting operation, such as milling, or the like. Additionally, a counter sink or recess 72 is formed on each surface of the tool body 66 that intersects the cooling channel 70. In this particular embodiment, unlike the FIGS. 4-7 embodiment, the cooling channel 70 is formed to a blind depth within the tool body 66. Therefore, only one recess 72 is provided. A cover plate 74 is formed that is sized to be received within the recess 72. The cover plate 74 may also be formed from 6061-T6 aluminum. The cover plate 74 may be brazed to the tool body 66 by application of a brazing material and heating of the assembled tool body 66 and cover plate 74 in a vacuum brazing process. Alternative methods that may be applied include controlled atmosphere brazing with a flux braze, due to the small surface area of the brazing. After the tool 64 has been brazed, the tool can be heat treated and ports may be machined intersecting the cooling channel 70. The depicted embodiment is advantageous for providing two dimensional cooling patterns that may be cut into the tool body 66 in one direction of the tool body 66.

Alternatively, instead of providing the cover plate 74 to fit within the recess 72, the cover plate 74 may be sized to engage an entire top surface of the tool body 66 and to be brazed thereto thereby enclosing the cooling channel 70.

Figure 10:
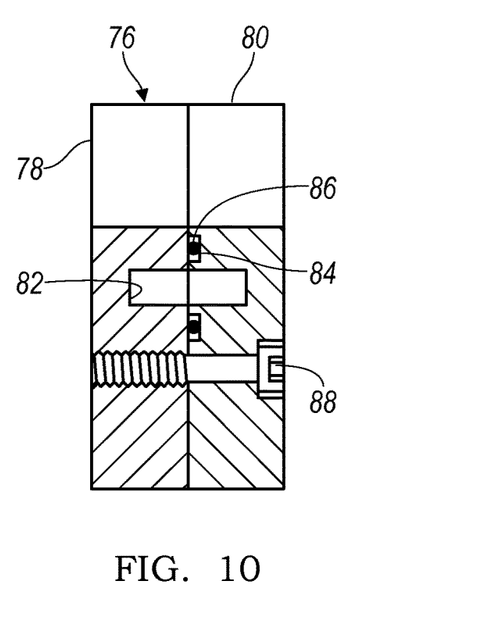
FIG. 10 is a section view of a fourth tool illustrating another alternative embodiment taken along section line 9-9 in FIG. 8.

FIG. 10 illustrates an alternative cross section whereby a tool body 76 is cut into halves 78, 80 thereby exposing interior surfaces of the tool body 76. Subsequently, a cooling channel 82 can be machined into one or both of the tool body halves 78, 80. An O-ring path 84 is machined around the cooling channel 82 on one of the tool halves 78, 80. Subsequently, an O-ring 86 is placed within the O-ring path 84 and the tool halves 78, 80 are fastened together. The tool body 76 permits more freedom in the geometries of the cooling channel 82 as compared to the prior embodiment. However, the tool body 76 also requires additional machining for fasteners 88; and the O-ring 86 may be limited for heating and cooling applications. Furthermore, the tool body 76 may require additional maintenance such as replacement of the O-ring 86 periodically.

The cooling channels 70, 82 of these embodiments may be enhanced in turbulence by the addition of baffles within the cooling channel. Alternatively, the conformal cooling channels 70, 82 may be provided to receive a cooling tube that is inserted therethrough, which may be formed by stamping or any other suitable operation.

Figure 11:
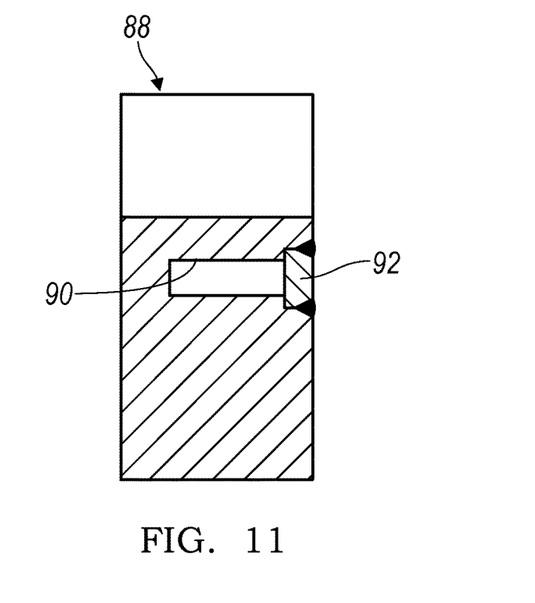
FIG. 11 is a section view of a fifth tool illustrating another alternative embodiment taken along section line 9-9 in FIG. 8.

Referring now to FIGS. 8 and 11, another tool body 88 is illustrated which includes a channel 90 cut to a blind depth. A cover plate is placed within a recessed pocket as described above and welded into place. Alternatively, rather than cutting a recess, a cover plate 92 could be sized to be received within the cooling channel 90. The cover plate 92 can be welded to the tool body 88 with a 4043 weld, 4000 series weld, or eutectic alloy weld, which may prevent fractures in the base metal and weld. This operation obviates subsequent heat treatment such as that required post brazing.

The above embodiments illustrate various methods for providing a tool with conformal cooling through a high volume manufacture process. For the embodiments requiring brazing, a fluxless vacuum brazing process may be employed. One such brazing operation that has proven successful for brazing laminate plates is discussed below with reference to the embodiment of FIGS. 4-6, and is further described in U.S. Patent Application Publication No. 2009/0214890 A1 hereby incorporated by reference in its entirety. The braze foil is also cut to the same shape as the outside profile of the cover plate 56. The tool body 48 and cover plate 56 receive mechanical abrasion of their surfaces. This allows for deburring, and increases the amount of braze surface area. This operation may be done by dual action sanding of the surfaces. In order to minimize oxidization during abrasion, the media used for this operation should not include any form of an oxide according to at least one embodiment. Silicon Carbide abrasives can be utilized to prevent any introduction of oxides to the surfaces to be brazed. Utilization of a coarse grit sanding media increases the surface area for absorbing the braze material. The tool body 48 and cover plate 56 may require deburring, which can be performed as a separate process, or may be accomplished by the sanding operation.

Upon completion of mechanical abrasion, the tool body 48, cover plate 56 and braze foil are cleaned in an acetone solution, and dried. The next step is to rack the tool body 48, cover plate 56 and braze foil and submerge these components into a five percent alkali solution for one to four minutes. The alkali solution allows the tool body 48, cover plate 56 and braze foil to be cleaned and remove any contamination. The tool body 48, cover plate 56 and braze foil are removed from the alkali solution and rinsed with deionized water for neutralization. The tool body 48, cover plate 56 and braze foil are then submerged into an eight to twelve percent acid (hydrofluoric and nitric) solution for two to six minutes. The acid solution provides the deoxidation of the braze surfaces.

Upon removal of the tool body 48, cover plate 56 and braze foil from the acid, the parts are rinsed with deionized water for neutralization and then dried with clean dry compressed air. When drying of the tool body 48, cover plate 56 and braze foil is complete, the assembly of the tool 46 is immediately performed. The tool 46 is assembled with the tool body 48 and cover plate 56 in a horizontal plane. When the assembly of the tool 46 is completed, the tool 46 is immediately placed into a vacuum furnace. If the tool 46 cannot be immediately placed in the vacuum furnace, the components can be stored in an inert environment container which is free of oxygen.

The vacuum furnace set-up can be optimized for the brazing process of the tool 46. A drip pan can be installed to catch any excess braze and protect the furnace. A precision ground graphite plate is installed in the drip pan to provide a flat base for the tool 46 throughout the temperature range of the brazing cycle, and allows for flatness of the part when brazing is completed. Ceramic plates, are installed on top of the graphite plate 63, as shown in FIG. 7, to insulate the tool 46 from the high thermal conductive graphite and isolate radiated furnace energy to tool 46.

An aluminum vent/drain plate is installed on top of the ceramic plates. The vent/drain plate is the same profile as the tool 46, and has passages located in the location of drain holes in the tool 46, and extend to the outside of the plate so the brazing environment is allowed into the internal features of the tool 46. The vent/drain plate is coated with Boron Nitride to prevent brazing of this plate to the tool 46.

The tool 46 is placed on the vent/drain plate. A weight plate is then installed on top of the tool 46. It also has the same profile as the tool 46 and contains clearance holes for alignment pins. The weight plate is coated with Boron Nitride to prevent brazing of this plate to the tool 46. The function of this plate is to allow even weight distribution on the tool surface 46 and not on the alignment pins, which may protrude through the top of the part 46. Rather than using a weight plate, high temperature springs 61 can apply the clamping load, as shown in FIG. 7. This results in less thermal mass in the furnace so heating can be faster or more parts can be loaded into the furnace at one time. When high temperature springs 61 are used, loads of up to twenty psi can be achieved which in turn enables thinner layers of foil, such as 0.002 to 0.003 inches.

Ceramic plates are installed on top of the tool 46. A graphite plate 63, as shown in FIG. 7, is installed on top of the ceramic plates, and a weight with a calculated mass, specific for the tooling process, is placed on top of the graphite plate 63. The graphite plate 63 on top of the tool 46 allows even weight distribution across the surface of the tool 46. The mass is determined using a calculation which considers cross sectional surface area. The mass allows compression of the tool body 48 and cover plate 56 and maintains flatness and consistent braze joint thickness.

Thermocouples are used during the brazing process that are sheathed in an austenitic nickel-chromium-based superalloy, such as Inconel®, from Special Metals Corporation in Huntington, W. Va., USA. Each tool 46 has a passage to install the thermocouple to be in contact with the center, and/or last place to reach braze temperature, of the tool 46. Although the brazing process occurs in high vacuum levels, the possibility of oxide is still present due to oxides that may be existing within the base metal and peripheral materials. To further prevent oxidation, high purity Magnesium turnings are placed in a ceramic crucible within the vacuum furnace hot zone. During the brazing cycle the Magnesium heats up and reacts with any oxygen that may be present and prevent oxidation of the aluminum. The required mass of Magnesium turnings is dependent on the duration of the brazing cycle.

Prior to performing the aluminum brazing process in the vacuum furnace, a vacuum furnace cycle is heated to 2000 degrees Fahrenheit in a reducing, hydrogen, atmosphere to remove any oxides that may be present in the furnace hot zone. The reducing vacuum furnace cycle is performed without the aluminum tool 46, but with all braze set-up peripheral materials as previously discussed, except the Magnesium, which is only introduced into the furnace with the tool 46. The vacuum furnace brazing cycle also employs specific high tolerance temperature control throughout the brazing cycle.

With the reducing furnace cycle completed and the tool 46 braze set-up complete, the aluminum braze cycle for one embodiment is initiated and is described as follows: the vacuum furnace chamber is pumped down to $10^{-5}$ to $10^{-6}$ torr vacuum (this vacuum is maintained throughout cycle); the heat is ramped to 750 degrees Fahrenheit at a rate of thirty degrees Fahrenheit per minute until the part 46 reaches 750 degrees Fahrenheit; the heat is then ramped to 1020 degrees Fahrenheit at a rate of thirty degrees Fahrenheit per minute until the part 46 reaches 1020 degrees Fahrenheit; the temperature is held for a maximum of ten minutes at 1020 degrees Fahrenheit; the heat is then ramped to control thermocouple temperature of 1095 degrees Fahrenheit at a rate of thirty degrees Fahrenheit per minute; when the part 46 temperature reaches 1095 degrees Fahrenheit, plus or minus five degrees Fahrenheit a cooling rate is ramped at a maximum rate permitted by the vacuum furnace to 985 degrees Fahrenheit; when the part 46 reaches 985 degrees Fahrenheit, turn off the heat and cool at maximum rate to room temperature. Upon completion of the furnace braze cycle, the part 46 is removed from the furnace, and the set-up is disassembled. The vent/drain plate and weight plate are then removed. The tool 46 is then solution heat treated and T6 hardening process is performed to final material specifications.

Alternatively, another vacuum brazing operation may be employed, which has proven successful for brazing laminate plates together. Upon completion of mechanical abrasion, the tool body 48, cover plates 56 and braze foil are cleaned in an acetone solution, and dried. The next step is to rack the tool body 48, cover plates 56 and braze foil and submerge these components into a five percent alkali solution, which is at a temperature of 130 degrees Fahrenheit, for four to six minutes. The alkali solution allows the tool body 48, cover plates 56 and braze foil to be cleaned and remove any contamination. The tool body 48, cover plates 56 and braze foil are removed from the alkali solution and rinsed with deionized water for neutralization. The tool body 48, cover plates 56 and braze foil are then submerged into an ten to twelve percent acid (hydrofluoric and nitric) solution for four to six minutes. The acid solution provides the deoxidation of the braze surfaces.

Upon removal of the tool body 48, cover plates 56 and braze foil from the acid, the parts are rinsed with deionized water for neutralization and then dried with clean dry air. Optimum drying conditions can be performed in a recirculating air oven at a temperature of 300 degrees Fahrenheit to reduce moisture. When drying of the tool body 48, cover plates 56 and braze foil is complete, the assembly of the tool 46 can be immediately performed. If assembly of the component 46 is not immediately performed, the components 46 are stored in containers to minimize exposure to the air for minimizing oxidation of the prepared components.

The assembly of the components 46 may be performed in a dust free area. Manual handling of the components 46 and foil may be performed with rubber gloves to minimize contamination introduced on any of the brazing surfaces of the components 46.

When the assembly of the component 46 is completed, the component 46 is ready to be installed onto a brazing fixture and then immediately placed into a vacuum furnace. If the component 46 cannot be immediately placed in the vacuum furnace, the components 46 can be stored in an inert environment container which is free of oxygen.

A brazing fixture may be employed for the aluminum brazing process. The brazing fixture is designed and built with materials that have excellent high strength properties and at high temperatures, utilizes a low mass design to prevent a heat sink effect yet providing structural strength, and provides a system to apply distributed forces to the brazed components 46 for compression throughout the braze cycle while maintaining a fixed position of the component 46 on the fixture.

As discussed above, reduction in mass results in reduction of thermal mass, thereby providing a reduction in throughput of the vacuum furnace. Additional mass can be reduced by utilizing high temperature alloy springs, such as ribbon springs manufactured from an austenitic nickel-chromium-based superalloy sheet, such as Inconel® 750X sheet. The ribbon springs generate a force to be applied to the component 46, instead of applying a weight as in the previous embodiment. The ribbon springs are manufactured from 0.060 inch thick sheet stock and are formed to a specific shape, then solution heat treated and age hardened to maximize mechanical properties and high temperature strength. The ribbon springs maintain their strength and applied force during brazing because the brazing temperatures for aluminum are well below the heat treatment temperatures that would affect the properties of the material. Although ribbon springs are described, various spring types may be employed such as coil springs or the like to design to a fixture size and load rate for a specific brazing application.

In order to prevent the ribbon springs from providing point loads upon the component 46, additional supports are employed to distribute the force uniformly over the surface of the component 46.

The set-up of the components 46 to be brazed, on the brazing fixture can be optimized for the brazing process. Dependent on the size of component 46, multiple components 46 can be set-up on the fixture for a single furnace run. To determine the layout of multiple components 46, a minimum of 1.5 inches spacing can be maintained between components 46. The following describes a method, for example, for preparing each component 46 for brazing on the braze fixture. A rectangular 0.060 inch thick 304 stainless steel sheet base plate is provided 0.25 inch wider than the profile of the component 46 to be brazed. The base plate is placed on the base of the fixture in the determined location. The base plate has been stress relieved, painted with Magnesium Hydroxide, and dried before being used in the set-up. The base plate provides a flat surface for the component 46 and load distribution to the honeycomb base.

An aluminum vent/drain plate is installed on top of the base plate. The vent/drain plate is the same profile as the component 46, and has passages located in the location of drain holes in the component 46 and to the outside of the vent plate so the brazing environment/atmosphere is allowed into the internal features of the component 46. The vent/drain plate is painted with Magnesium Hydroxide to prevent brazing of this plate to the component 46. The component 46 is placed on the vent/drain plate. Another base plate is then installed on top of the component 46. The base plate in this location, provides a flat surface for load distribution on the component 46 surface.

Load u-channels are placed with the edges on top of the base plate so that the u-channels cover the entire surface of the component 46 and extend just beyond the component 46 in length. A minimum force is determined using a calculation which considers cross-sectional surface area. The force allows compression, maintaining flatness, constraining the location of the component 46 on the fixture, and consistent braze joint thickness. The ribbon springs are installed between the load u-channels and the top of the braze fixture. The ribbon springs are compressed to install into the braze fixture, and total force is determined by the measurable pre-load of the spring multiplied by the spring rate multiplied by the total number of springs per component 46. This total force is designed to be greater than or equal to the calculated force required during the brazing operation.

Load thermocouples are used during the brazing process that are sheathed in an austenitic nickel-chromium-based superalloy, such as Inconel®, from Special Metals Corporation in Huntington, W. Va., USA. A minimum of two load thermocouples are used and the first is installed in the component 46 closest to center of the fixture, and a second in another component 46 on a peripheral region of the fixture. Although the brazing process occurs in high vacuum levels, the possibility of oxide is still present due to oxides or oxide bearing medium that may be existing within the base metal and peripheral materials. To further prevent oxidation of the aluminum component 46, high purity Magnesium turnings are placed on top of the braze fixture. During the brazing cycle the Magnesium vaporizes in the brazing environment then allowing reaction with any oxygen that may be present and prevent or reduce oxidation of the aluminum. The required mass of Magnesium turnings is dependent on the braze furnace volume and duration of the brazing cycle.

Once all the components 46 are installed on the braze fixture as discussed, the loaded braze fixture can be installed on a furnace load cart. When loading the braze fixture on the furnace load cart, the braze fixture can be installed on a plurality of support cross bars. A small amount of Magnesium turnings is also placed into each of the support cross bars. The loaded braze fixture is subsequently installed in the vacuum furnace.

The vacuum furnace used for the aluminum brazing process of the tooling 46, or components, may be designed specifically for aluminum brazing. Typically aluminum brazing vacuum furnaces possess the following functionality: a nickel chrome based hot zone which can endure the thermal stress of backfilling and opening at brazing temperatures at approximately 1100 degrees Fahrenheit; a recirculation cooling system for the chamber to allow and maintain an elevated temperature of approximately 140 degrees Fahrenheit; an oversized vacuum system achieving $10^{-4}$-$10^{-5}$ torr; high tolerance temperature control of plus or minus five degrees Fahrenheit through a 1000-1200 degrees Fahrenheit range; while satisfying AMS 2750 standard.

Prior to performing the aluminum brazing process in the vacuum furnace, a vacuum furnace pre-heat cycle is performed heating the chamber to 1000 degrees Fahrenheit at a pressure less than $10^{-4}$ torr. The furnace chamber water temperature may be increased between 100 and 130 degrees Fahrenheit so that relative humidity is decreased to reduce or prevent moisture in the furnace. The furnace chamber water temperature can be increased during the furnace pre-heat cycle.

With the furnace pre-heat cycle complete and the braze fixture set-up complete, the aluminum braze cycle, is initiated. The vacuum furnace chamber is backfilled with nitrogen. Then, the furnace door is opened and the braze fixture is loaded in the furnace. The furnace door is closed, and the furnace chamber is pumped down to 100 μm. Then the chamber is backfilled with nitrogen to a ten inch vacuum, which is repeated three times. Next the chamber is pumped down to less than $10^{-4}$ torr. Subsequently the furnace temperature is ramped to 300 degrees Fahrenheit and maintained for one minute. The furnace temperature is then ramped to 1040 degrees Fahrenheit at a rate of twenty degrees Fahrenheit per minute. This temperature is maintained until the load thermocouples reach 1040 degrees Fahrenheit plus or minus five degrees Fahrenheit. The furnace temperature is then ramped to 1100 degrees Fahrenheit at a rate of twenty degrees Fahrenheit per minute until the load thermocouples reaches 1080 degrees Fahrenheit plus or minus five degrees Fahrenheit. The heat is disabled and the chamber is backfilled with nitrogen until the furnace door is opened. The load thermocouples are removed and the braze fixture is removed from the furnace. The furnace door is closed, and the brazed components 46 are air cooled in the braze fixture under load until the component temperature is less than 500 degrees Fahrenheit. While cooling to room temperature, when the parts 46 reach 985 degrees Fahrenheit, the heat can be turned off for cooling at maximum rate to room temperature. The braze fixture is disassembled and the brazed components 46 are removed.

Additional heat treatment of the brazed components 46 may be employed, depending on the final material specifications. Solution heat treatment of the 6061 components 46 may be utilized, and a standard water quench process can be used to achieve the T4 condition of the 6061 aluminum. The 6061 components 46 may then be age hardened to a T6 condition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a non-laminate mold block comprising:

machining a contoured finished surface on a non-laminate tool body for forming an article in a forming operation, the finished surface being adapted to receive a tool insert;

forming a heat transfer channel within the non-laminate tool body, at least a portion of the channel being offset generally equidistant from the finished surface to provide a path for conformal cooling of the insert; and forming a pair of ports into the non-laminate tool body, each port intersecting the channel;

sand casting the channel in the non-laminate tool body when forming the tool body;

forming a sand core insert prior to forming the non-laminate tool body, the sand core insert formed with a conformal cooling portion sized to define the channel; and removing sand from the sand core insert after forming the tool body to provide the channel.

2. The method of claim 1 further comprising inserting the tool insert with the forming surface for forming the article in the forming operation into the finished surface of the tool body.

3. The method of claim 1 wherein forming the tool body comprises positioning the sand core insert into one of a permanent mold and a sand core mold and casting molten metal about the sand core insert to provide the tool body.

4. The method of claim 1 wherein the sand core insert is formed by molding a mixture of sand and a binder upon a wire reinforcement, and drying and hardening the mixture.

5. A mold block comprising a tool body having a contoured finished surface adapted to receive a tool insert having a forming surface for forming a bottle neck in a molding operation, the tool body defining an internal heat transfer channel for heat transfer with the tool insert forming surface, wherein at least a portion of the channel is offset generally equidistant from the finished surface to provide a path contoured for conformal cooling of the insert, and the tool body having a pair of ports, each port intersecting the channel;
- wherein the tool body comprises a first portion and a second portion;
- wherein the first portion defines the heat transfer channel having a blind depth; and
- wherein the first portion defines a groove surrounding the channel; and
- wherein the second portion defines another channel having a blind depth, the another channel offset generally equidistant from the finished surface to provide another path contoured for conformal cooling of the insert.

6. The mold block of claim 5
- wherein the contoured finished surface has a first semi-cylindrical region formed therein and a second semi-cylindrical region formed therein and generally coaxial with the first semi-cylindrical region, the second region having a larger radius than the first region, thereby creating a shoulder in the contoured finished surface; and
- wherein the at least a portion of the internal heat transfer channel is generally arcuate and generally coaxial with the first semi-cylindrical region of the finished surface, and has a larger radius than the second semi-cylindrical region of the finished surface.

7. The mold block of claim 6 wherein the heat transfer channel has a serpentine path.

8. The mold block of claim 7 wherein the finished surface has n curves and the serpentine path has at least n+3 curves.

9. The mold block of claim 6 wherein the first and second semi-cylindrical regions are spaced apart axially from one another; and
- wherein the shoulder is positioned between the first and second semi-cylindrical regions.

10. The mold block of claim 5 wherein the tool body is cast from aluminum.

11. The mold block of claim 5 further comprising at least one baffle within the channel to enhance turbulence of a fluid within the channel.

12. The mold block of claim 5 wherein a surface of the first portion of the tool body defining the channel is roughened to enhance turbulent flow of a coolant.

13. The mold block of claim 5 further comprising a seal sized to fit into the groove, for sealing the channel when the first portion and second portion are fastened together.

14. The mold block of claim 5 wherein the second portion defines another groove surrounding the channel.

15. The mold block of claim 5 wherein the channel of the first portion and the another channel of the second portion cooperate to form a heat transfer passage along the path and the another path contoured for conformal cooling of the insert.

16. The mold block of claim 5 wherein the channel and the groove are machined into the first portion of the tool body.

17. The mold block of claim 5 further comprising ribs within the internal channel to provide structural support for the tool body and enhance turbulent flow of a coolant through the channel.

18. The mold block of claim 5 wherein the tool body is formed from aluminum.

19. The mold block of claim 5 wherein the first portion of the tool body defines a first portion of the contoured finished surface adapted to receive the tool insert; and
- wherein the second portion defines a second portion of the contoured finished surface adapted to receive the tool insert.

20. A mold tool assembly comprising:
- a mold block according to claim 18; and
- a tool insert having a forming surface for forming a bottle neck in a molding operation.

21. The mold tool assembly of claim 20 wherein the tool insert is formed from tool steel.

22. A method for forming a non-laminate mold block according to claim 5 comprising:
- cutting the tool body into the first portion and the second portion;
- machining the channel to a blind depth into the first portion;
- machining a groove surrounding the channel on the first portion;
- placing a seal into the groove; and
- reassembling the first portion and second portion together to enclose the channel, such that the seal seals the channel.

* * * * *